Sept. 8, 1942. L. J. LUNAS 2,295,413
D'ARSONVAL MECHANISM CONSTRUCTION
Filed Oct. 13, 1939  2 Sheets-Sheet 1
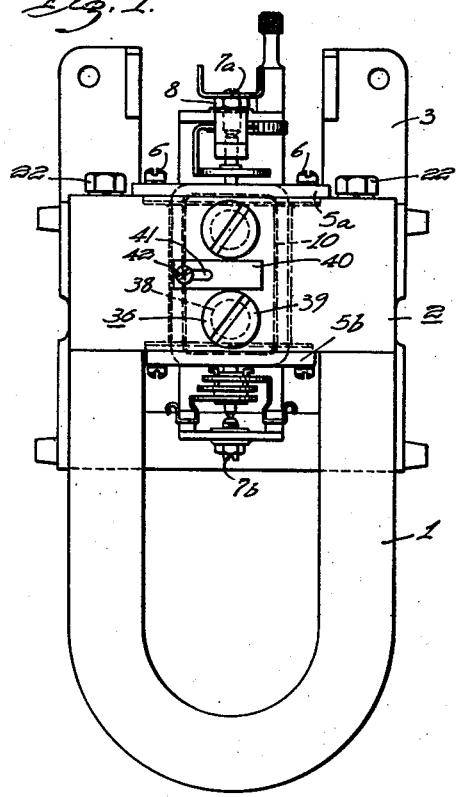
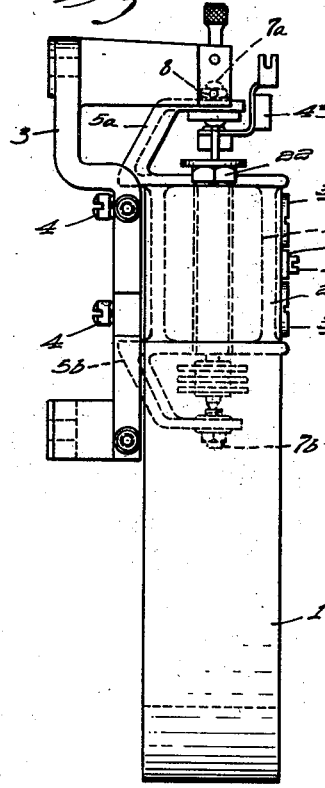
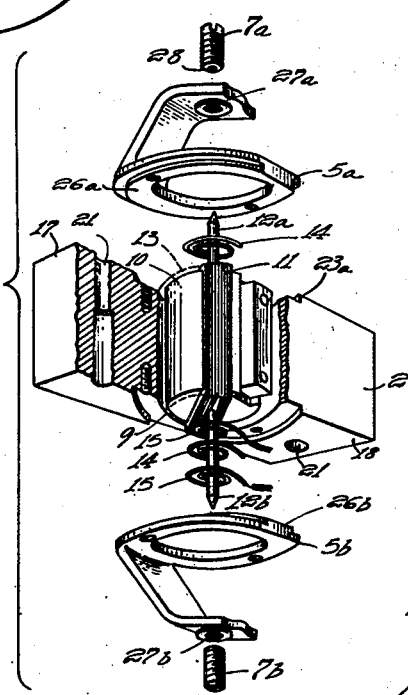
INVENTOR
Lawrence J. Lunas.

Sept. 8, 1942.  L. J. LUNAS  2,295,413
D'ARSONVAL MECHANISM CONSTRUCTION
Filed Oct. 13, 1939  2 Sheets-Sheet 2

WITNESSES:

INVENTOR
Lawrence J. Lunas.
BY
ATTORNEY

Patented Sept. 8, 1942

2,295,413

UNITED STATES PATENT OFFICE 2,295,413

D'ARSONVAL MECHANISM CONSTRUCTION

Lawrence J. Lunas, Cedar Grove, N. J., assignor to Westinghouse Electric & Manufacturing Company, East Pittsburgh, Pa., a corporation of Pennsylvania Application October 13, 1939, Serial No. 299,284

10 Claims. (Cl. 171—95)

This invention relates to measuring instruments and it has particular relation to permanent magnet D'Arsonval instruments.

Many measuring instruments employ magnetic structures for providing paths for magnetic flux employed in the operation of the measuring instruments. A permanent magnet D'Arsonval instrument is a representative of this class of instruments. The conventional D'Arsonval instrument comprises a permanent magnet and a pole-piece assembly for establishing an intense magnetic field in an annular gap. A coil is mounted for rotation in this gap in accordance with current passing therethrough. Because of the intensity of the magnetic field and the resulting high sensitivity of the measuring instrument, such an instrument is extremely sensitive to slight variations in the registration of its component parts. Slight discrepancies in the location of parts, such as those occasioned by variations in the dimensions of parts during the manufacture of an instrument, may result in a lack of uniformity in the response of the instrument to quantities to be measured. Furthermore, such variations in dimensions are objectionable for the reason that parts produced for such instruments may not be interchangeable. A still further variation in the properties of a D'Arsonval instrument is caused by the variation in multi-part pole-piece assemblies produced by temperature changes, vibration or other causes.

In accordance with my invention, parts which must be registered accurately are provided with coacting surfaces of revolution. In a D'Arsonval instrument, it is important that bearing brackets be positioned accurately on a pole-piece assembly. For this reason, I provide a bearing bracket and a pole-piece assembly with coacting male and female surfaces for registration purposes. Preferably, these surfaces are surfaces of revolution concentric with the annular gap customarily employed in such instruments. The pole-piece assembly preferably is constructed from a unitary homogeneous block of magnet material in order to preclude variations in the air gap caused by movements of component parts.

In order to position a magnetic core accurately in an opening provided in a pole-piece assembly, I first machine a magnetic core accurately and subsequently attach temporarily a spacer thereto. While the spacer is temporarily attached to the magnetic core, the spacer is machined to fit intimately a surface of the opening in the pole-piece assembly. The spacer is then unfastened from the magnetic core, and fastening means applied through the pole-piece assembly for uniting the magnetic core and spacer permanently in place.

It is, therefore, an object of my invention to provide a measuring instrument of simplified construction.

It is another object of my invention to provide a measuring instrument having important parts positioned by coacting surfaces of revolution.

It is another object of my invention to provide a unitary homogeneous pole-piece assembly for a D'Arsonval measuring instrument having a cylindrical opening for receiving a coil and having an annular registering seat concentric with said opening.

It is another object of my invention to provide a pole-piece assembly and a bearing bracket for a D'Arsonval instrument having coacting annular male and female registering surfaces.

It is a further object of my invention to provide a D'Arsonval instrument having a pole-piece assembly, bearing brackets, a magnetic core, and a coil assembly registered by surfaces of revolution concentric about a common axis.

It is another object of my invention to provide an improved method for assembling the parts of a D'Arsonval instrument.

It is another object of my invention to provide an improved method for centering a magnetic core relative to a pole-piece assembly.

Other objects of my invention will be apparent from the following description when taken in connection with the accompanying drawings, in which:

Figure 1 is a view in front elevation of a measuring instrument embodying my invention;

Fig. 2 is a view in side elevation of the measuring instrument illustrated in Fig. 1;

Fig. 3 is an exploded view in perspective, with parts broken away, of the measuring instrument illustrated in Fig. 1;

Figure 4:
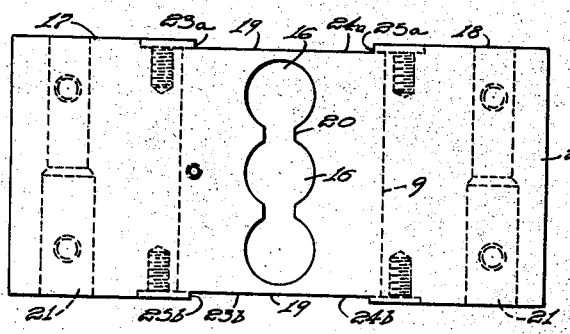
Fig. 4 is a view in front elevation of a pole-piece assembly suitable for the instrument of Fig. 1.

Referring to the drawings, Figure 1 shows a D'Arsonval measuring instrument having a U-shaped permanent magnet 1 positioned with its legs abutting a pole-piece assembly 2. The magnet and pole-piece assembly may be carried by any suitable frame 3 to which they are attached in any suitable manner, as by machine screws 4. The pole-piece assembly 2 carries two bearing brackets 5a and 5b which may be attached thereto by machine screws 6, or in any other suitable manner. These bearing brackets carry respectively bearing screws 7a and 7b which may be threaded in tapped openings provided in the bearing brackets in order to permit adjustments thereof. Suitable lock nuts 8 may be provided for locking the bearing screws in any position to which they are adjusted.

The relationship of the various parts may be seen more clearly by reference to Fig. 3. As therein illustrated, the pole-piece assembly 2 is provided with a central opening 9 in which a magnetic core 10 is positioned. The magnetic core 10 has a diameter smaller than the opening 9 in order to provide an annular gap extending substantially around the magnetic core.

A coil 11, provided with pivots 12a and 12b, is mounted in the bearings 7a and 7b for rotation in the air gap between the magnetic core 10 and the pole-piece assembly 2. The coil may be of any conventional construction, but preferably it is of the type disclosed in my Patent No. 2,130,852. In this construction, the coil 11 is wound on a semi-cylindrical electroconductive form 13 (shown in dotted lines) which increases the damping of the coil assembly and increases the strength of the form on which the coil 11 is wound. The coil 11 may be provided in a customary manner with springs 14 for controlling movements thereof, and with flexible conductors 15 for establishing contact with the terminals of the coil.

By reference to Fig. 3, it will be noted that dimensional variations in the assembly of various parts will affect the operation of the measuring instrument. For example, it is desirable to employ as small an air gap as possible. If the magnetic core 10 is not concentrically mounted in the pole-piece assembly 2, a large air gap must be provided to accommodate the resulting dissymmetry. Moreover, if the bearing screws 7a and 7b are not supported in alignment with the axis of the opening in the core 2, the coil 11 will not be supported symmetrically in the annular gap between the magnetic core 10 and the pole-piece assembly 2. In addition, any variation between parts of the pole-piece assembly 2 will produce corresponding variations in the response of the instrument. In order to eliminate these sources of error or variation, I have provided an improved construction which will be described in detail below.

Figure 5:
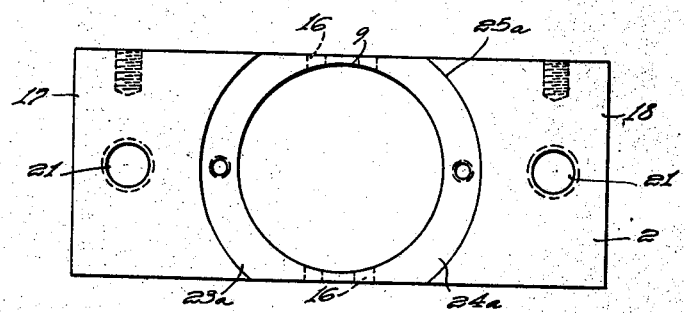
Fig. 5 is a view in top plan of the pole-piece assembly illustrated in Fig. 4.
Figure 6:
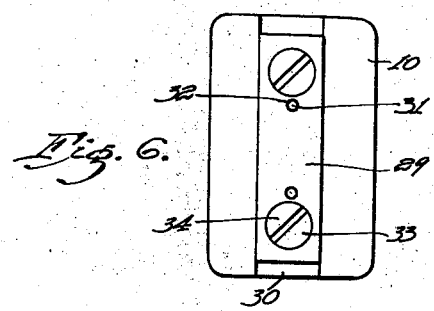
Fig. 6 is a view in front elevation of a magnetic core suitable for insertion in the pole-piece assembly of Figs. 4 and 5.
Figure 7:
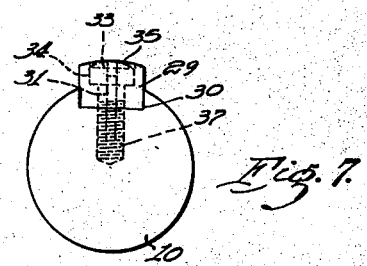
Fig. 7 is a view in bottom plan of the magnetic core illustrated in Fig. 6.

Variations in the dimensions and positions of the parts of the pole-piece assembly 2 are prevented by constructing the pole-piece assembly from a single homogeneous block of magnetic material, as illustrated clearly in Figs. 4 and 5. The opening 9 is machined accurately in the pole-piece assembly, and is illustrated as a cylindrical opening for reception of the magnetic core 10 and the coil 11. In addition to the main opening 9, a number of additional openings 16 are drilled in the pole-piece assembly 2 on axes intercepting the axis of the cylindrical opening 9 at right angles. Although any desired number of openings 16 may be provided, I have illustrated three openings on each side of the pole-piece assembly. The purpose of these openings is to provide two distinct magnetic poles 17 and 18 when the permanent magnet 1 is placed against the pole-piece assembly. By removing most of the material between these two poles, most of the flux passing therebetween is forced to traverse the magnetic core 10. Only enough material is left by the openings 16 to provide bridges 19 having sufficient mechanical strength to prevent distortion of the pole-piece assembly 2.

The separation of the poles 17 and 18 may be enhanced by removing portions of the material between the openings 16 in order to separate adequately the protuberances 20. The bridges 19 have cross-sections so small that an insignificant amount of flux can pass therethrough.

The pole-piece assembly may be provided with holes 21 for reception of machine screws 22 (see Fig. 1) which are threaded into tapped openings provided in the magnet 1 for securing the pole-piece assembly 2 to the magnet.

Because of the unitary construction of the pole-piece assembly 2, the poles 17 and 18 cannot become displaced under the influence of vibration or temperature changes. Material employed for the pole-piece assembly may be any conventional magnetic material, such as cold rolled steel.

Registration of the bearing brackets 5a and 5b is provided by recesses 23a and 23b formed in the pole-piece assembly 2. These recesses may be of any desired configuration, but as illustrated they are of annular shape concentric with the opening 9 and providing flat annular seats 24a and 24b and cylindrical edges 25a and 25b. The bearing brackets 5a and 5b are provided with mating protuberances 26a and 26b for these recesses. The protuberances have flat exposed faces for engaging the flat faces 24a and 24b of the recesses, and have cylindrical walls for engaging the cylindrical walls 25a and 25b of the recesses. Consequently, each protuberance and its coacting recess form male and female surfaces of revolution for positioning accurately the related bracket on the pole-piece assembly 2.

The brackets are provided with tapped openings 27a and 27b which are formed concentric with the protuberances 26a and 26b, respectively, for reception of the bearing screws. Preferably, the openings 27a, 27b and the protuberances are formed during the same machining operation in order to assure concentricity. The bearing screws 7a and 7b may be provided with bearing openings 28 which may be jeweled for reception of the bearing pivots 12a and 12b.

In order to locate the magnetic core 10 accurately within the opening 9 of the pole-piece assembly 2, the magnetic core 10 first is machined accurately to size. After completion of this machining operation, a spacer 29 is positioned in a channel 30 provided in the magnetic core. To assist in locating the parts and maintaining them in position during handling, one or more pins 31 may be attached to the magnetic core and may be received in openings 32 drilled in the spacer 29. The spacer is temporarily attached to the magnetic core by machine screws 33 having heads which are received in recesses 34 provided in the spacer 29.

With the spacer assembled in this manner on the magnetic core, the outer surface 35 of the spacer is machined to the same radius as that of the opening 9 in order that the outer surface of the spacer may fit intimately against the portion of the wall of the opening. When the magnetic core 10 is to be mounted in the pole-piece assembly, the temporary attaching screws 33 are removed and permanent attaching screws 36

(see Fig. 1) are provided for securing the magnetic core to the pole-piece assembly. The screws 33 and 36 pass freely through the spacer 29, and are threaded in tapped openings 37 in the core 10. These tapped openings are so positioned that the screws 36 may be passed through one or more of the openings 16 in order to secure the magnetic core to the pole-piece assembly. As illustrated, two tapped openings 37 are provided which are spaced apart by a distance equal to the spacing between the outer openings 16 on one face of the pole-piece assembly. The screws 36 are provided with collars 38, which are snugly received in the openings 16, and with heads 39, which are larger than the openings. Preferably, the spacer 29 and the screws 36 are of non-magnetic material, such as brass, in order to avoid magnetically bridging the poles 17 and 18 of the pole-piece assembly. Similarly, the brackets 5a and 5b may be constructed of a non-magnetic material, such as brass, for the same reason.

If desired, an adjustment for the magnetic field produced in the annular gap between the magnetic core 10 and the pole-piece assembly 2 may be provided. For example, in Fig. 1, a strip 40 of magnetic material is positioned over one of the openings 16. The strip 40 has an elongated slot 41 through which a machine screw 42 passes for attaching the strip to the pole-piece assembly. By loosening the screw 42 and moving the strip 40, the bridging action of the magnetic strip across the opening 16 which it tends to cover may be varied, as desired.

The measuring instrument herein illustrated may be employed for indicating purposes, recording purposes, or otherwise. In the specific example illustrated, a bracket 43 is attached to the upper pivot 12a for rotation therewith. This bracket may be employed for supporting a recording pen which is actuated in accordance with the movements of the coil 11.

It is believed that the construction and assembly of an instrument embodying my invention are apparent from the foregoing description. The pole-piece assembly 2 may be produced by machining a circular opening 9 in the center thereof, and then drilling out sufficient material by means of the openings 16 to provide two well-defined pole-pieces 17 and 18. The annular recesses 23a and 23b are then machined on opposite surfaces of the pole-piece assembly. Each bearing bracket 5a or 5b is provided with a protuberance which closely fits the recess provided on the corresponding face of the pole-piece assembly in order to position the bracket with reference to the pole-piece assembly.

After the magnetic core 10 has been machined accurately to a cylindrical shape, the spacer 29 is temporarily attached thereto by means of the screws 33. This spacer then is machined while so mounted in order to conform intimately to the wall of the opening 9.

In order to insert the magnetic core in the pole-piece assembly 2, the screws 33 are removed and the coil 11 is slipped over the magnetic core. The magnetic core, together with the coil, then is inserted in the opening 9, and screws 36 are passed through the opening 16 in order to attach the magnetic core 10 permanently to the pole-piece assembly 2.

At this stage, the bearing brackets 5a and 5b may be attached to the pole-piece assembly 2 by means of the machine screws 6, and the bearing screws 7a and 7b may be adjusted to engage properly the pivots 12a and 12b of the coil 11. When the pole-piece assembly 2 is attached to the magnet 1 by means of the screws 22, a completely operative measuring instrument is provided.

It will be noted that the bearing brackets 5a and 5b, the magnetic core 10 and bearings 7a and 7b all are united to the pole-piece assembly 2 by surfaces of revolution having a common axis. Since a surface of revolution is a shape permitting of simple and accurate machining, it follows that the manufacture of the measuring instrument is greatly facilitated thereby. Moreover, this construction maintains the high accuracy with which the parts are positioned indefinitely, and the various parts are easily interchangeable. Certain of the subject matter disclosed herein is disclosed and claimed in my copending divisional application Serial No. 424,306, filed December 24, 1941.

Although I have described my invention with reference to certain specific embodiments thereof, it is obvious that numerous modifications thereof are possible. Therefore, I do not wish my invention to be restricted except as required by the appended claims when interpreted in view of the prior art.

I claim as my invention:

1. In an electrical measuring instrument, a unitary magnetic pole-piece assembly having an opening extending therethrough, a coil assembly positioned in said opening, and means mounting said coil assembly for rotation including a bearing bracket positioned at each end of said opening, said bearing brackets and said pole-piece assembly having coacting surfaces of revolution, each of said coacting surfaces being concentric about the axis of rotation of said coil assembly for properly positioning said coil assembly in said opening.

2. In an electrical measuring instrument, a unitary magnetic pole-piece assembly having a cylindrical opening extending therethrough, a magnetic core in said opening for providing an annular gap extending for a substantial distance around said magnetic core, a coil assembly positioned in said gap, and means mounting said coil assembly for rotation including a bearing bracket positioned at each end of said opening, said bearing brackets and said pole-piece assembly having coacting surfaces of revolution, each of said coacting surfaces being concentric about the axis of rotation of said coil assembly, and extending for a major portion of the distance around said opening, for properly positioning said coil assembly in said gap.

3. In an electrical measuring instrument, a magnetic pole-piece assembly having an opening therein, a magnetic core in said opening, a spacer positioned in said opening for spacing said magnetic core from the wall surface defining said opening to provide a gap, a movable assembly positioned in said gap, and means mounting said movable assembly for rotation including a bearing-bracket assembly, said bearing-bracket and pole-piece assemblies having coacting surfaces of revolution concentric about the axis of rotation of said movable assembly for locating said bearing-bracket and pole-piece assemblies in predetermined positions relative to each other, and said wall surface and said spacer having coacting surfaces of revolution concentric about the axis of rotation of said movable assembly for positioning accurately said magnetic core relative to said pole-piece assembly.

4. In an electrical measuring instrument, a unitary magnetic pole-piece assembly having an opening extending therethrough, a magnetic core positioned in said opening, a spacer element extending between said magnetic core and the wall surface of said opening, and a bearing-bracket element extending from said pole-piece assembly adjacent each end of said opening for providing bearings aligned with said opening, said spacer and bearing-bracket elements having surfaces of revolution positioned substantially in contact with corresponding surfaces of revolution on said pole-piece assembly, said surfaces of revolution being concentric about a common axis.

5. In an electrical measuring instrument, a unitary pole-piece assembly having a cylindrical opening extending between two surfaces thereof, each of said surfaces having a substantially cylindrical depression concentric with said cylindrical opening, and a bearing bracket for each of said surfaces, each of said bearing brackets having a substantially cylindrical portion snugly fitting one of said depressions and substantially coextensive therewith for positioning the bearing bracket relative to said pole-piece assembly.

6. In an electrical measuring instrument, a unitary pole-piece assembly having a cylindrical opening extending between two surfaces thereof, each of said surfaces having a substantially cylindrical depression concentric with said cylindrical opening, a bearing bracket for each of said surfaces, each of said bearing brackets having a substantially cylindrical portion snugly fitting one of said depressions and substantially coextensive therewith for positioning the bearing bracket relative to said pole-piece assembly, a cylindrical magnetic core having a smaller diameter than said opening, and spacing means for supporting said magnetic core in said opening to provide an annular gap around a substantial portion of said magnetic core, said spacing means including a spacing element positioned between said magnetic element and the wall surface of said opening and extending axially of said magnetic core for a substantial distance, said spacing element having a surface in contact with the wall of said cylindrical opening and of substantially the same curvature as said wall.

7. In an electrical measuring instrument, a permanent magnet, a unitary magnetic pole-piece assembly for said permanent magnet having a cylindrical opening extending therethrough between opposed surfaces thereof, an annular depression in each of said surfaces concentric with said cylindrical opening, a bearing bracket for each of said surfaces, each of said bearing brackets having an annular portion extending into and snugly fitting one of said annular depressions for positioning said bearing brackets relative to said pole-piece assembly, said bearing brackets including spaced bearings having center lines coinciding with the center line of said cylindrical opening, a cylindrical magnetic core having a diameter smaller than that of said cylindrical opening, and means for supporting said magnetic core in said opening to provide an annular gap therearound comprising a spacer positioned between said magnetic core and the wall of said cylindrical opening and extending axially of said magnetic core for a substantial distance, the surface of said spacer in contact with said wall having the same curvature as said wall, means extending through said spacer for attaching said magnetic core to said pole-piece assembly, and a coil supported in said spaced bearings for rotation in said annular gap.

8. A pole-piece assembly for an electrical measuring instrument comprising a unitary, homogeneous, magnetic pole-piece member having a substantially cylindrical opening extending between two surfaces thereof, each of said surfaces having an annular depression concentric with said opening, said pole-piece member having a plurality of recesses diametrically opposed relative to said cylindrical opening for increasing the magnetic reluctance between portions of said pole-piece member on opposite sides of said cylindrical opening.

9. A pole-piece assembly for an electrical measuring instrument comprising a unitary, homogeneous, magnetic pole-piece member having a main opening extending therethrough and having a plurality of opposed auxiliary openings intersecting said main opening for reducing the cross-section of magnetic material connecting portions on opposite sides of said main opening, a unitary magnetic core positioned in said main opening for providing with said pole-piece member a substantially annular gap, and means for attaching said magnetic core to said pole-piece member comprising attaching means extending through one of said auxiliary openings.

10. A pole-piece assembly for an electrical measuring instrument comprising a unitary, homogeneous, magnetic pole-piece member having a main opening extending therethrough and having a plurality of opposed auxiliary openings intersecting said main opening for reducing the cross-section of magnetic material connecting portions on opposite sides of said main opening, a unitary magnetic core positioned in said main opening for providing with said pole-piece member a substantially annular gap, and means for attaching said magnetic core to said pole-piece member comprising a spacer positioned between said magnetic core and said magnetic member, and an attaching screw extending freely through one of said auxiliary openings and spacer, and threaded into said magnetic core.

LAWRENCE J. LUNAS.